(12) United States Patent
Shani

(10) Patent No.: US 9,197,739 B1
(45) Date of Patent: Nov. 24, 2015

(54) SYSTEM, METHOD, AND COMPUTER PROGRAM FOR PROVIDING GUARANTEED QUALITY OF SERVICE

(75) Inventor: Omer Shani, Savvyon (IL)

(73) Assignee: Amdocs Software Systems Limited, Dublin (IE)

( * ) Notice: Subject to any disclaimer, the term of this patent is extended or adjusted under 35 U.S.C. 154(b) by 574 days.

(21) Appl. No.: 13/569,108

(22) Filed: Aug. 7, 2012

Related U.S. Application Data

(60) Provisional application No. 61/590,296, filed on Jan. 24, 2012.

(51) Int. Cl.
*H04L 12/16* (2006.01)
*H04M 3/42* (2006.01)
*H04M 15/00* (2006.01)

(52) U.S. Cl.
CPC ............... *H04M 3/42* (2013.01); *H04M 15/00* (2013.01)

(58) Field of Classification Search
CPC ............................... H04M 3/42; H04M 15/00
USPC .......................................................... 370/239
See application file for complete search history.

(56) References Cited

U.S. PATENT DOCUMENTS

| | | | |
|---|---|---|---|
| 7,656,794 B2 | 2/2010 | Medvinsky | |
| 2012/0089727 A1* | 4/2012 | Raleigh et al. | 709/224 |
| 2012/0327816 A1* | 12/2012 | Morrill et al. | 370/259 |

OTHER PUBLICATIONS

3GPP, "ETSI TS 123 203 v10.5.0", published Jan. 3, 2012, retrieved from Internet Archive "https://archive.org/details/etsi_ts_123_203_v10.05.00", version 10.5.0, pp. 1-133.*
Farooq et al., "A Framework to Achieve Guaranteed QoS for Applications and High System Performance in Multi-Institutional Grid Computing," 2006, retrieved from http://www.sce.carleton.ca/~ufarooq/ufarooq_matchmaking.pdf.
Netto et al., "SLA-based advance reservations with flexible and adaptive time QoS parameters," 2007, retrieved form www.cloudbus.org/reports/SLA-AR-QoS2007.pdf.

* cited by examiner

*Primary Examiner* — Jung Park
*Assistant Examiner* — Albert Shih
(74) *Attorney, Agent, or Firm* — Zilka-Kotab, PC

(57) ABSTRACT

A system, method, and computer program product are provided for providing guaranteed quality of service. In use, a request for a guaranteed quality of service (QoS) during a predefined period is received from a user. Additionally, the guaranteed quality of service (QoS) is provided to the user during the predefined period.

19 Claims, 4 Drawing Sheets

SYSTEM, METHOD, AND COMPUTER PROGRAM FOR PROVIDING GUARANTEED QUALITY OF SERVICE

CLAIM OF PRIORITY

This application claims the benefit of U.S. Provisional Patent Application No. 61/590,296, filed Jan. 24, 2012, the entire contents of which are incorporated herein by reference.

FIELD OF THE INVENTION

The present invention relates to communication networks, and more particularly to providing quality of service (QoS) within communication networks.

BACKGROUND

Communication network services have become a common medium for individuals and other entities to transmit and receive information. For example, users may check their email, purchase goods from online vendors, and view events utilizing network services. Unfortunately, conventional methods for providing such communication network services have exhibited various limitations.

For example, a customer may not be able to have their communication network services guaranteed for a particular date and time, and may therefore experience interruptions in the availability of their communication network services. These interruptions may interfere with events desired to be viewed by the customer (e.g., sporting events, movies, etc.). There is thus a need for addressing these and/or other issues associated with the prior art.

SUMMARY

A system, method, and computer program product are provided for providing guaranteed quality of service. In use, a request for a guaranteed quality of service (QoS) during a predefined period is received from a user. Additionally, the guaranteed quality of service (QoS) is provided to the user during the predefined period.

DETAILED DESCRIPTION

Figure 1:
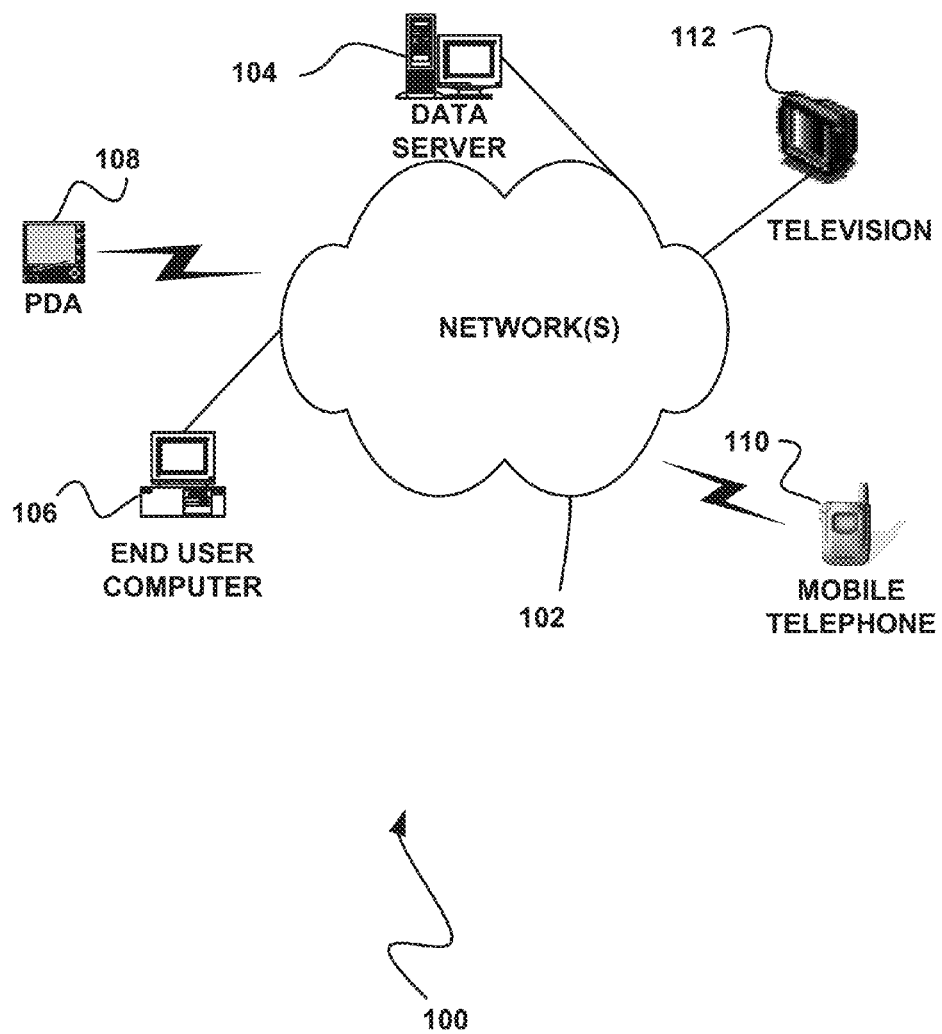
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
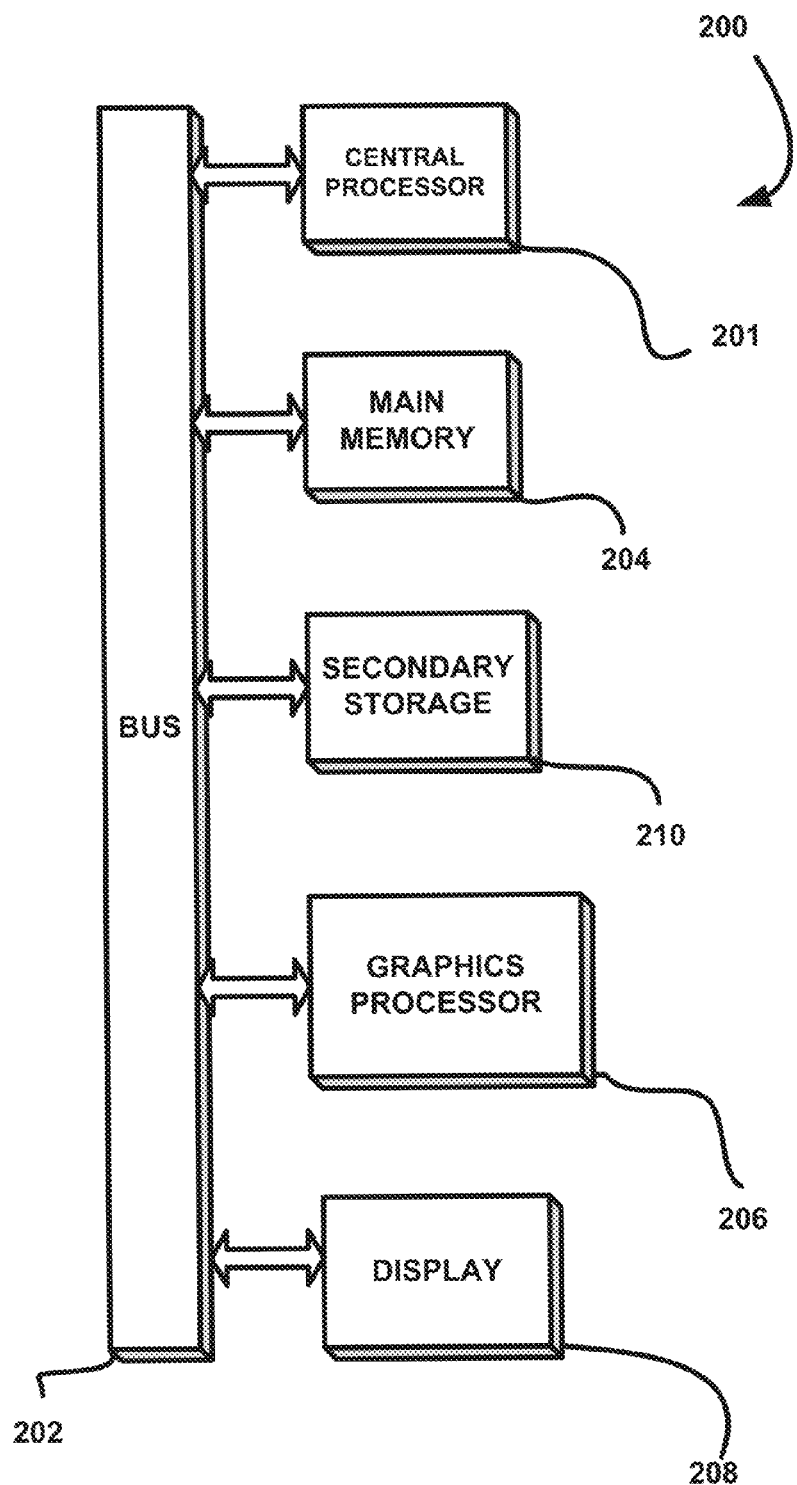
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
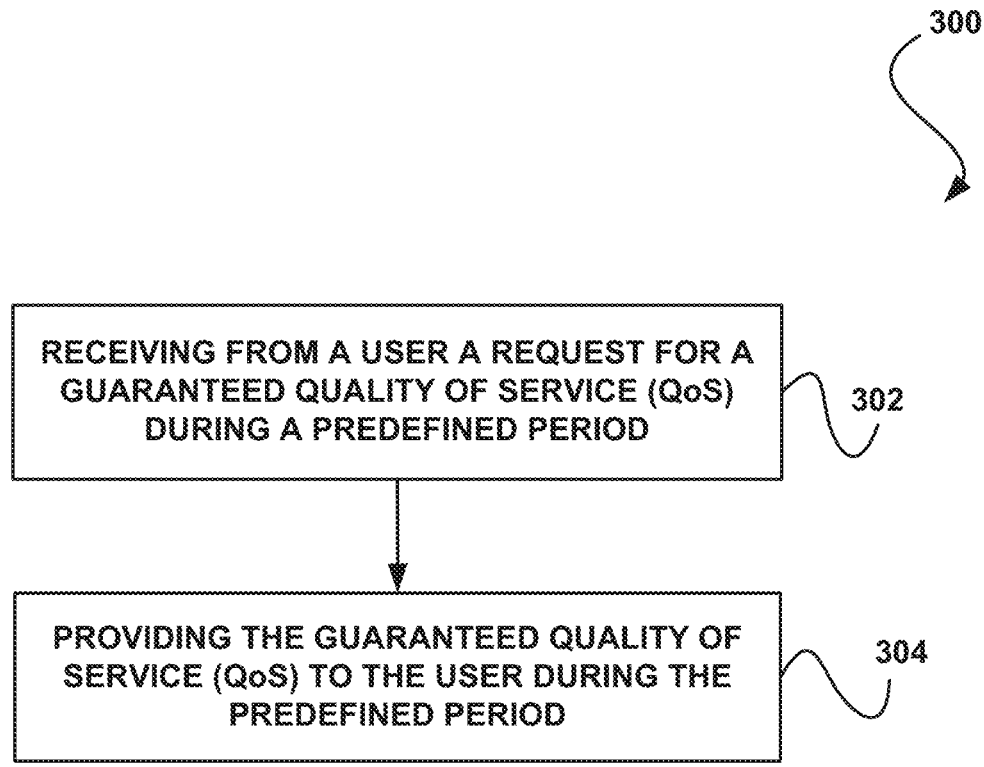
FIG. 3 illustrates a method for providing guaranteed quality of service, in accordance with one embodiment.

FIG. 3 illustrates a method 300 for providing guaranteed quality of service, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request for a guaranteed quality of service (QoS) during a predefined period is received from a user. In one embodiment, the guaranteed QoS may be associated with one or more communication services. In another embodiment, the QoS may be defined for a specific service provided by a communication network (e.g., a packet-switched network, etc.). For instance, the QoS may be guaranteed for a streaming media service, a voice over IP (VoIP) service, a videoconferencing service, an online game service, etc.

Additionally, in one embodiment, the QoS may be associated with one or more factors. For example, the QoS may include one or more of a stability of a provided communication service, an availability of a provided communication service, an existence of one or more delays within a communication service, etc. In another embodiment, the QoS may be associated with one or more technical elements. For example, the QoS may include one or more of reliability of a provided service, a scalability of a provided communication service, an effectiveness of a provided communication service, a maintainability of a provided communication service, a grade or level of a provided communication service, etc.

Further, in one embodiment, the QoS may be associated with a data rate. For example, the QoS may include a minimum data rate (e.g., bandwidth, etc.), a minimum latency, a minimum throughput, etc. In another embodiment, the QoS may be associated with an image quality. For example, the QoS may include a minimum image quality (e.g., video display resolution, etc.). In yet another embodiment, the request for the guaranteed QoS may be received in response to an offer for the guaranteed QoS. For example, an entity that provides the guaranteed QoS may market the guaranteed QoS to a plurality of users (e.g., by advertising the guaranteed QoS to the plurality of users, etc.), and the request for the guaranteed QoS may be sent by the user in response to such marketing.

Further still, in one embodiment, the predefined period may include one or more of a predetermined date, time, and duration during which the QoS is guaranteed for the user. For example, the user's request for the guaranteed QoS may include a request for a guaranteed QoS to be provided to the user during a particular date, time, and duration. In another embodiment, the guaranteed QoS may be guaranteed in that the user may be compensated for the QoS (e.g., refunded all or some of a cost associated with the QoS, paid an additional premium, etc.) if such QoS is not provided.

Also, as shown in operation 304, the guaranteed quality of service (QoS) is provided to the user during the predefined period. In one embodiment, an availability of the guaranteed QoS may be confirmed before the guaranteed QoS is provided to the user. For example, an available amount of network resources may be determined for the predefined period requested by the user, and the user's request may be granted if the available amount of resources is greater than the amount requested by the user. In another embodiment, the user may be charged for the guaranteed QoS before the guaranteed QoS is provided. For example, once the availability of the user's requested guaranteed QoS is confirmed, the user may be billed for the guaranteed QoS for the predefined period.

In addition, in one embodiment, providing the guaranteed QoS to the user may include notifying a provider of the communication service for which the QoS is guaranteed. For example, one or more network elements responsible for providing the communication service may be notified that the QoS for that service is guaranteed for a particular user for the predefined period. In this way, the provider of the telecommunication service may be able to prepare such communication service to ensure that the guaranteed QoS is provided to the user.

Furthermore, in one embodiment, the guaranteed QoS may be provided to the user during the predefined period in response to the user's request to utilize the one or more communications services for which the QoS is guaranteed. For example, a provider of the one or more communications services may receive a request from the user to utilize the one or more communications services. In another embodiment, providing the guaranteed QoS to the user may include determining whether the request from the user has been made within the predefined period for which the QoS is guaranteed. For example, the guaranteed QoS may only be provided to the user if the user requests the one or more communications services for which the QoS is guaranteed during the predefined period.

Further still, in one embodiment, providing the guaranteed QoS to the user may include determining whether the user has already consumed the guaranteed QoS. For example, in response to the user's request for the one or more communications services, the communications services may be provided to the user only if it is determined that the guaranteed QoS associated with those services has not already been consumed by the user during the predefined period.

Also, in one embodiment, providing the guaranteed QoS to the user may include providing the one or more communication services to the user in accordance with the guaranteed QoS. For example, the one or more communications services may be provided to the user in such a manner that all conditions of the QoS are met (e.g., a minimum bandwidth is maintained, interruptions are avoided, etc.). In another embodiment, the user's utilization of the one or more communication services during the predefined period may be observed. In yet another embodiment, the observed usage may be reported, saved, etc. In this way, a communication service provider may monitor service usage and adjust one or more elements of the provision of the service in response to such usage.

Additionally, in one embodiment, it may be determined whether the guaranteed QoS was successfully provided to the user. For example, it may be determined whether the one or more communications services were provided to the user in accordance with the guaranteed QoS. In another embodiment, if it is determined that the guaranteed QoS was not successfully provided to the user, the user may be compensated (e.g., by issuing a full or partial refund, etc.).

In this way, the user may be able to purchase in advance a guarantee of a predetermined QoS for one or more communications services. Additionally', the provider of such communications services may be given advance notice of the demand for such QoS and may make adjustments to the provisioning of such communications services in preparation of such demand. Further, the provider may benefit from unused QoS guarantees purchased in advance by one or more users.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
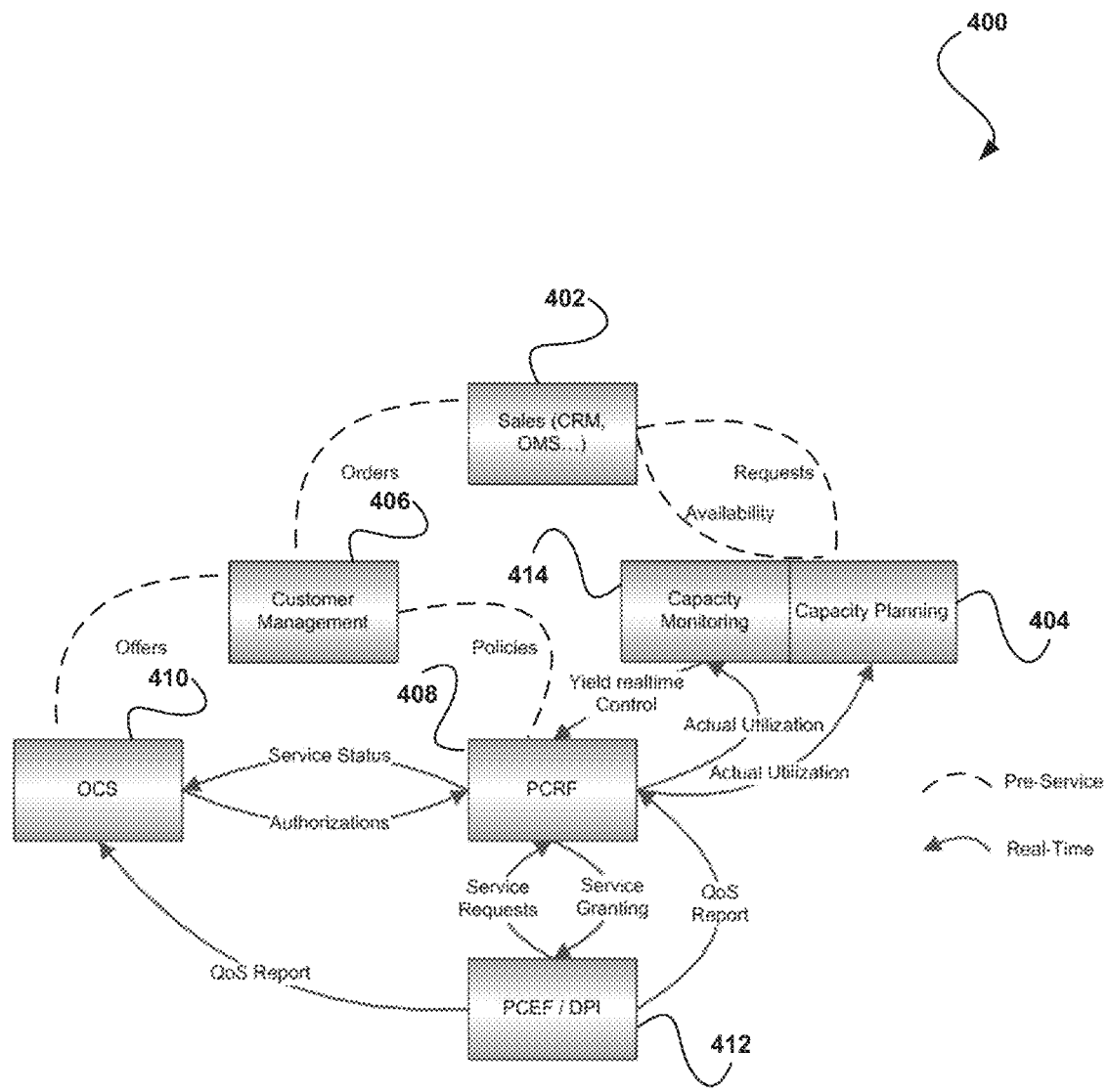
FIG. 4 illustrates an exemplary guaranteed quality of service (QoS) system, in accordance with one embodiment.

FIG. 4 illustrates an exemplary guaranteed quality of service (QoS) system 400, in accordance with one embodiment. As an option, the system. 400 may be carried out in the context of the details of FIGS. 1-3. Of course, however, the system 400 may be carried out in any desired environment. Further, the aforementioned definitions may equally apply to the description below.

As shown, the guaranteed quality of service (QoS) system 400 includes a sales module 402. In one embodiment, the sales module 402 may market guaranteed QoS for a predetermined service at a predetermined time and date to one or more users. For example, the sales module 402 may create and send a dynamic proposition to the one or more users, where the proposition may include an offer to purchase in advance guaranteed QoS for a specific service at the predetermined time and date. In another embodiment, the predetermined service may include an event, such as a broadcast sporting event, a movie, etc. In still another event, the predetermined service may be provided to the user via a communication network.

Additionally, in one embodiment, the dynamic proposition may include a cost (e.g., a price, etc.) associated with the guaranteed QoS. In another embodiment, the cost may be set according to one or more criteria. For example, the cost may be set according to how lucrative the predetermined service may be estimated to be. In another example, the cost may be set according to the scope of the event (e.g., whether the event is local, nationwide, etc.). In yet another example, the cost may be set according to a current capacity of the guaranteed QoS system 400. For instance, the system 400 may be able to provide guaranteed QoS to a predetermined number of users, and the cost for such guaranteed QoS may increase as the number of users who have paid for such guaranteed QoS approaches the predetermined number.

Further, in one embodiment, the cost may be set according to the time of the predetermined service. For example, the predetermined service may be associated with a predetermined time (e.g., a time at which the predetermined service is performed). Additionally, as the predetermined time approaches e.g., as a window between a current time and the predetermined time decreases), the cost associated with the guaranteed QoS may increase.

Further still, the guaranteed QoS system 400 includes a capacity planning module 404. In one embodiment, the sales module 402 may receive a request for the guaranteed QoS for the predetermined service at the predetermined time and date from a user in response to the marketing performed by the sales module 402. In another embodiment, the sales module 402 may send such request to the capacity planning module 404, and the capacity planning module 404 may determine whether the request can be fulfilled.

For example, the capacity planning module 404 may determine whether the guaranteed QoS for the predetermined service at the predetermined time and date is still available. For instance, the capacity planning module 404 may check to see whether resources associated with the guaranteed QoS (e.g., resources assigned to provide the guaranteed QoS, etc.) are still available and have not already been reserved by another user. In another embodiment, the guaranteed QoS may be provided to a threshold number of users, and the capacity planning module 404 may determine whether the threshold number of users has already been met.

Also, in one embodiment, the capacity planning module 404 may determine a total capacity of the guaranteed QoS system 400 and may determine whether servicing the guaranteed QoS for the user would result in a resource utilization that exceeds a predetermined percentage of the total capacity of the guaranteed QoS system 400. In this way, the capacity planning module 404 may ensure a serviceability of all guaranteed QoS packages that have been sold to users. In another embodiment, the capacity planning module 404 may return to the sales module 402 an availability of the requested guaranteed QoS for the predetermined service at the predetermined time and date.

In addition, the guaranteed QoS system 400 includes a customer management module 406, a Policy Charging and Rules Function (PCRF) module 408, and an online charging system (OCS) module 410. In one embodiment, the PCRF module 408 may determine policy rules within the system 400. In another embodiment, the PCRF module 408 may access one or more subscriber/user databases and may aggregate information from multiple sources for creating rules and making intelligent policy decisions for each user within the system 400. In yet another embodiment, if the capacity planning module 404 return to the sales module 402 an indication that the requested guaranteed QoS is not available for the predetermined service at the predetermined time and date, then the user may not be charged and no further action may be taken.

In still another embodiment, if the capacity planning module 404 return to the sales module 402 an indication that the requested guaranteed QoS is available for the predetermined service at the predetermined time and date, then the sales module 402 may request payment for the guaranteed QoS for the predetermined service at the predetermined time and date. Additionally, once the sales module 402 has received payment for the guaranteed QoS, the sales module 402 may convert the request to an order for the guaranteed QoS and may send the order to the customer management module 406.

Furthermore, in one embodiment, in response to receiving the user's order from the sales module 402, the customer management module 406 may send a time-limited policy to the PCRF module 408. In another embodiment, the time-limited policy may include an identification of the user that requested the guaranteed QoS, the date, time, and duration of the guaranteed QoS, the service for which the QoS is guaranteed, etc. In yet another embodiment, in response to receiving the user's order from the sales module 402, the customer management module 406 may send an offer to the OCS module 410. In still another embodiment, the offer may include details of the guaranteed QoS, including the date, time, and duration of the guaranteed QoS.

Further still, the guaranteed QoS system 400 includes a Policy and Charging Enforcement Function/Deep Packet Inspection (PCEF/DPI) module 412. In one embodiment, a request for the service associated with the guaranteed QoS may be received from the user at the PCEF/DPI module 412. In response to the receipt of the service request, the PCEF/DPI module 412 may forward such request to the PCRF module 408, which may then request a service status from the OCS module 410. In another embodiment, the OCS module 410 may then determine a validity of the specific service request sent by the user. For example, the OCS module 410 may determine whether the guaranteed QoS has already been consumed by the user (e.g., whether the user has already exhausted the service associated with the guaranteed QoS, whether the date and time associated with the request match the date and time of the guaranteed QoS, etc.).

Also, in one embodiment, the OCS module 410 may conditionally return an authorization to the PCRF module 408, based on the determination of the validity of the service request. For example, if the OCS module 410 determines that the user's service request is not valid (e.g., that the user has already exhausted the requested resource, etc.), then the OCS module 410 may not return an authorization to the PCRF module 408. In another example, if the OCS module 410 determines that the user's service request is valid (e.g., that the user has not already exhausted the requested resource, etc.), then the QoS module 410 may return an authorization to the PCRF module 408.

Additionally, in one embodiment, in response to the receipt of an authorization by the OCS module 410, the PCRF module 408 may send an indication that the requested service is granted to the PCEF/DPI module 412. In another embodiment, in response to the receipt of the indication that the requested service is granted, the PCEF/DPI module 412 may provide the predetermined service to the user while providing the user with the guaranteed QoS. For example, the PCEF/DPI module 412 may adjust available bandwidth and other resources such that the predetermined service is provided to the user without any interruption, errors, or other issues. In yet another embodiment, the guaranteed QoS may be provided by deep packet inspection (DPI) and/or traffic detection function (TDF) network elements, which may control the provisioning of the predetermined service to the user such that the QoS expected by the user is guaranteed.

Further, in one embodiment, the PCEF/DPI module 412 may monitor the provisioning of the predetermined service to the user. For example, the PCEF/DPI module 412 may determined whether the guaranteed QoS has been met during the provisioning of the predetermined service. In another embodiment, the PCEF/DPI module 412 may then send service and QoS reports to the OCS module 410 and the PCRF module 408. For example, the service and QoS reports may include a summary of the provisioning of the predetermined service to the user, utilization of the predetermined service and the guaranteed QoS, a determination as to whether the guaranteed QoS was met during the provisioning, etc.

Further still, in one embodiment, the PCRF module 408 may report the user's utilization to the capacity monitoring module 414 (which may monitor granted QoS in the system 400 based on factors such as time and location) and capacity planning module 404. In one embodiment, the user's utilization may include the utilization of the predetermined service and the guaranteed QoS monitored by the PCEF/DPI module 412. In one embodiment, if it is determined that the guaranteed QoS was not delivered during the provisioning of the predetermined service, the PCRF module 408 or another module in the guaranteed QoS system 400 may compensate the user (e.g., by providing the user with a full or partial refund in accordance with the original terms of the guaranteed QoS order purchased by the user, etc.).

Also, in one embodiment, the PCRF module 408 may be involved in collecting requests for specific upsells of guaranteed QoS. For example, once a service is sold, the PCRF module 408 may specify a required QoS, which may be monetized to provide upsell for the operator. In another embodiment, a purchase of the monetized QoS by a user may also provide information for capacity planning teams (e.g., indications for an increase in demand, etc.) in advance.

In this way, the user's actual utilization may be analyzed in addition to planned sales of merchandised QoS plans in order to monitor the capability of the QoS system 400 to guarantee QoS during the provisioning of predetermined services. In another embodiment, the analysis may be used by the QoS system 400 during the performance of yield management.

Additionally, QoS levels may be offered for specific days/events in advance, which may enable an upsell of capacity in advance (e.g., minutes in advance, hours in advance, days in advance, etc.). This may result in a monetary gain from the scenarios in which guaranteed QoS is purchased but not used. Further, QoS capacity planning may be connected to the process of the offering of QoS in advance. The input received from this system 400 may enable a dynamic planning of advance QoS offers, and information about the demand for such services may become an important input to the capacity planning of the operator.

Further still, guaranteed QoS may be treated as merchandise that can be sold at a future date. Input for such a system may include, from the network side, the existing capacity in various areas, yield management of these areas and the future capacity in the relevant areas. From the business side, input may include live events such as boxing contests, the super ball, the world series games, etc. (e.g., events where purchasing unhindered quality of service may be desired). Also, the network may therefore control and monitor the quality of service for specific clients. In this way, QoS may be upsold as a sellable item of merchandise and may be guaranteed utilizing a real-time connection to yield management which forecasts expected use and adjusts/prepares accordingly.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
    sending, by a system to a user, an offer for a guaranteed quality of service (QoS) for a predetermined service during a predefined period, the guaranteed QoS including a guaranteed stability and availability of a provided event, and the offer including a price for the guaranteed QoS that is set according to:
        an estimation as to how lucrative the provided event is,
        an indication as to whether the provided event is local or nationwide,
        a current capacity of the system, and
        a time until the event is provided;
    receiving by the system from the user a request for the guaranteed QoS for the predetermined service during the predefined period, in response to the offer;
    determining, by the system, whether servicing the guaranteed QoS for the user would result in a resource utilization of the system that exceeds a predetermined percentage of a total resource capacity of the system; and
    providing by the system to the user the guaranteed QoS for the predetermined service during the predefined period, when it is determined by the system that servicing the guaranteed QoS for the user would not result in the resource utilization of the system that exceeds the predetermined percentage of the total resource capacity of the system.

2. The computer program of claim 1, wherein the QoS is defined for a specific service provided by a communication network.

3. The computer program of claim 1, wherein the QoS further includes a minimum data rate.

4. The computer program of claim 1, wherein the offer is sent as advertising to a plurality of users.

5. The computer program of claim 1, wherein the predefined period includes one or more of a predetermined date, time, and duration during which the QoS is guaranteed for the user.

6. The computer program of claim 1, wherein the user is charged for the guaranteed QoS before the guaranteed QoS is provided.

7. The computer program of claim 2, wherein one or more network elements responsible for providing the specific service are notified that the QoS for the service is guaranteed for the user for the predefined period.

8. The computer program of claim 1, wherein the guaranteed QoS is provided to the user during the predefined period in response to the user's request to utilize one or more communications services for which the QoS is guaranteed.

9. The computer program of claim 8, wherein providing the guaranteed QoS to the user includes determining whether the request from the user has been made within the predefined period for which the QoS is guaranteed.

10. The computer program of claim 1, wherein providing the guaranteed QoS to the user includes determining whether the user has already consumed the guaranteed QoS.

11. The computer program of claim 2, wherein providing the guaranteed QoS to the user includes providing the predetermined service to the user in accordance with the guaranteed QoS.

12. The computer program of claim 11, wherein the user's utilization of the service during the predefined period is observed and recorded.

13. The computer program of claim 1, further comprising computer code for determining whether the guaranteed QoS was successfully provided to the user.

14. The computer program of claim 13, wherein if it is determined that the guaranteed QoS was not successfully provided to the user, the user is compensated.

15. The computer program of claim 14, wherein the compensation includes issuing the user a full or partial refund.

16. The computer program of claim 10, wherein services are provided to the user only if it is determined that the guaranteed QoS associated with those services has not already been consumed by the user during the predefined period.

17. A method, comprising:
- sending, by a system to a user, an offer for a guaranteed quality of service (QoS) for a predetermined service during a predefined period, the guaranteed QoS including a guaranteed stability and availability of a provided event, and the offer including a price for the guaranteed QoS that is set according to:
  - an estimation as to how lucrative the provided event is,
  - an indication as to whether the provided event is local or nationwide,
  - a current capacity of the system, and
  - a time until the event is provided;
- receiving by the system from the user a request for the guaranteed QoS for the redetermined service during the predefined period, in response to the offer;
- determining, by the system, whether servicing the guaranteed QoS for the user would result in a resource utilization of the system that exceeds a predetermined percentage of a total resource capacity of the system; and
- providing by the system to the user the guaranteed QoS for the predetermined service during the predefined period, when it is determined by the system that servicing the guaranteed QoS for the user would not result in the resource utilization of the system that exceeds the predetermined percentage of the total resource capacity of the system.

18. A system, comprising:
- a processor for:
  - sending, by a system to a user, an offer for a guaranteed quality of service (QoS) for a predetermined service during a predefined period, the guaranteed QoS including a guaranteed stability and availability of a provided event, and the offer including a price for the guaranteed QoS that is set according to:
    - an estimation as to how lucrative the provided event is,
    - an indication as to whether the provided event is local or nationwide,
    - a current capacity of the system, and
    - a time until the event is provided;
  - receiving by the system from the user a request for the guaranteed QoS for the predetermined service during the predefined period, in response to the offer;
  - determining, by the system, whether servicing the guaranteed QoS for the user would result in a resource utilization of the system that exceeds a predetermined percentage of a total resource capacity of the system; and
  - providing by the system to the user the guaranteed QoS for the predetermined service during the predefined period, when it is determined by the system that servicing the guaranteed QoS for the user would not result in the resource utilization of the system that exceeds the predetermined percentage of the total resource capacity of the system.

19. The system of claim 18, wherein the processor is coupled to memory via a bus.

\* \* \* \* \*